(12) United States Patent
Hayashi et al.

(10) Patent No.: US 10,814,286 B2
(45) Date of Patent: Oct. 27, 2020

(54) SEMIPERMEABLE MEMBRANE AND METHOD FOR PRODUCING SEMIPERMEABLE MEMBRANE

(71) Applicant: SUMITOMO ELECTRIC FINE POLYMER, INC., Sennan-gun, Osaka (JP)

(72) Inventors: Fumihiro Hayashi, Osaka (JP); Yasuhiko Muroya, Osaka (JP)

(73) Assignee: SUMITOMO ELECTRIC FINE POLYMER, INC., Sennan-gun, Osaka (JP)

( * ) Notice: Subject to any disclaimer, the term of this patent is extended or adjusted under 35 U.S.C. 154(b) by 304 days.

(21) Appl. No.: 15/759,579

(22) PCT Filed: Oct. 12, 2016

(86) PCT No.: PCT/JP2016/080180
§ 371 (c)(1),
(2) Date: Mar. 13, 2018

(87) PCT Pub. No.: WO2017/065150
PCT Pub. Date: Apr. 20, 2017

(65) Prior Publication Data
US 2019/0151805 A1    May 23, 2019

(30) Foreign Application Priority Data

Oct. 15, 2015  (JP) .................................. 2015-204039
May 26, 2016  (JP) .................................. 2016-105299

(51) Int. Cl.
*B01D 53/22* (2006.01)
*B01D 69/10* (2006.01)
(Continued)

(52) U.S. Cl.
CPC .............. *B01D 69/10* (2013.01); *B01D 69/02* (2013.01); *B01D 69/12* (2013.01); *B01D 71/32* (2013.01);
(Continued)

(58) Field of Classification Search
CPC ........ B01D 69/10; B01D 69/02; B01D 69/12; B01D 71/32; B01D 71/36; B01D 67/0083;
(Continued)

(56) References Cited

U.S. PATENT DOCUMENTS 2,081,155 A * 5/1937 Schneider .................. C08J 5/18
106/171.1
3,070,095 A * 12/1962 Torr ........................ A61F 5/485
428/323

(Continued)

FOREIGN PATENT DOCUMENTS

JP    S63-296822 A    12/1988
JP    2002-126479 A    5/2002
(Continued)

OTHER PUBLICATIONS

Kaaeid A. Lokhandwala et al., "Membrane separation of nitrogen from natual gas: A case study from membrane synthesis to commercial development", Journal of Membrane Science, vol. 346, No. 2, Jan. 1, 2010, pp. 270-279, XP055508148.

*Primary Examiner* — Anthony R Shumate
(74) *Attorney, Agent, or Firm* — Faegre Drinker Biddle & Reath LLP

(57) ABSTRACT

A semipermeable membrane according to an embodiment of the present invention includes a semipermeable membrane layer containing an amorphous resin as a main component, and a sheet-like supporting body that supports the semipermeable membrane layer. The supporting body has a porous
(Continued)

first supporting layer and a porous second supporting layer laminated on one of surfaces of the first supporting layer. The second supporting layer has a smaller mean flow pore diameter than the first supporting layer. The second supporting layer is impregnated with the semipermeable membrane layer. A ratio of the mean flow pore diameter of the second supporting layer to the mean flow pore diameter of the first supporting layer is preferably $1/1{,}000$ or more and $1/5$ or less. The mean flow pore diameter of the first supporting layer is preferably 0.05 μm or more and 20 μm or less, and the mean flow pore diameter of the second supporting layer is preferably 0.01 μm or more and 1 μm or less.

10 Claims, 2 Drawing Sheets

(51) Int. Cl.
*B01D 71/32* (2006.01)
*B01D 69/02* (2006.01)
*B01D 69/12* (2006.01)
*B01D 71/36* (2006.01)
*B01D 67/00* (2006.01)

(52) U.S. Cl.
CPC .......... *B01D 71/36* (2013.01); *B01D 67/0083* (2013.01); *B01D 67/0095* (2013.01); *B01D 2323/46* (2013.01); *B01D 2325/02* (2013.01); *B01D 2325/04* (2013.01)

(58) Field of Classification Search
CPC ............ B01D 67/0095; B01D 2323/46; B01D 2325/02; B01D 2325/04
See application file for complete search history.

(56) References Cited

U.S. PATENT DOCUMENTS

| | | | | |
|---|---|---|---|---|
| 3,457,170 A * | 7/1969 | Havens | ................. | B01D 61/08 210/641 |
| 4,243,701 A * | 1/1981 | Riley | ................. | B01D 67/0009 427/244 |
| 4,385,130 A * | 5/1983 | Molinski | ................. | B01J 39/20 521/31 |
| 4,474,858 A * | 10/1984 | Makino | ................. | B01D 61/38 210/500.39 |
| 4,874,129 A * | 10/1989 | DiSapio | ............. | A45D 40/0087 239/36 |
| 5,399,404 A * | 3/1995 | Laughlin | ................. | A61L 9/042 239/34 |
| 5,733,677 A * | 3/1998 | Golovin | ............. | H01M 12/065 429/407 |
| 6,036,738 A * | 3/2000 | Shanbrom | .......... | B01D 46/0028 55/524 |
| 6,120,477 A * | 9/2000 | Campbell | ............... | A61F 2/958 604/96.01 |
| 6,361,582 B1 | 3/2002 | Pinnau et al. | | |
| 9,314,736 B2 * | 4/2016 | Itou | ....................... | B01D 69/12 |
| 2004/0000231 A1 | 1/2004 | Bikson et al. | | |
| 2007/0122330 A1* | 5/2007 | Noh | ..................... | B01J 37/0219 423/239.1 |
| 2009/0184037 A1 | 7/2009 | Peters et al. | | |
| 2010/0203310 A1 | 8/2010 | Hayashi et al. | | |
| 2011/0196325 A1* | 8/2011 | Isele | ................. | A61F 13/4753 604/365 |

FOREIGN PATENT DOCUMENTS

| | | |
|---|---|---|
| JP | 2009-526640 A | 7/2009 |
| WO | WO-2008/018400 A1 | 2/2008 |

* cited by examiner

SEMIPERMEABLE MEMBRANE AND METHOD FOR PRODUCING SEMIPERMEABLE MEMBRANE

TECHNICAL FIELD

The present invention relates to a semipermeable membrane and a method for producing a semipermeable membrane. The present application claims priority from Japanese Patent Application No. 2015-204039 filed on Oct. 15, 2015 and No. 2016-105299 filed on May 26, 2016, and the entire contents of the Japanese applications are incorporated herein by reference.

BACKGROUND ART

Hitherto, gas separation membranes (semipermeable membranes) have been used as means for separating a gas containing a plurality of components into each component. Examples of such gas separation membranes include a membrane obtained by applying a polyimide to a porous membrane, and curing the polyimide to form a gas separation layer (semipermeable membrane layer) (refer to Japanese Unexamined Patent Application Publication No. 2002-126479) and a thin membrane obtained by applying a fluororesin powder onto a smooth film, and sintering the fluororesin powder (refer to International Publication No. 2008/018400).

Such a gas separation layer has very fine pores corresponding to intermolecular gaps of a resin. When a gas is introduced from one surface side to the other surface side of the gas separation membrane, some molecules in the gas permeate through the gas separation layer and are discharged to the other surface side of the gas separation layer. On the other hand, other molecules do not permeate through the gas separation layer and remain on the one surface side of the gas separation layer. As a result, the gas can be separated into each component.

CITATION LIST

Patent Literature

PTL 1: Japanese Unexamined Patent Application Publication No. 2002-126479

PTL 2: International Publication No. 2008/018400

SUMMARY OF INVENTION

A semipermeable membrane according to an embodiment of the present invention is a semipermeable membrane including a semipermeable membrane layer containing an amorphous resin as a main component, and a sheet-like supporting body that supports the semipermeable membrane layer. In the semipermeable membrane, the supporting body has a porous first supporting layer and a porous second supporting layer laminated on one of surfaces of the first supporting layer, the second supporting layer has a smaller mean flow pore diameter than the first supporting layer, and the second supporting layer is impregnated with the semipermeable membrane layer.

A method for producing a semipermeable membrane according to an embodiment of the present invention is a method for producing a semipermeable membrane including a semipermeable membrane layer containing an amorphous resin as a main component, and a sheet-like supporting body that supports the semipermeable membrane layer. The method includes a laminating step of laminating a porous first supporting layer and a porous second supporting layer to prepare a sheet-like supporting body, a dispersion impregnation step of impregnating the supporting body with a dispersion of an amorphous resin, and a drying step of drying the supporting body impregnated with the dispersion. In the method, the second supporting layer has a smaller mean flow pore diameter than the first supporting layer.

DESCRIPTION OF EMBODIMENTS

Technical Problem

Figure 1:
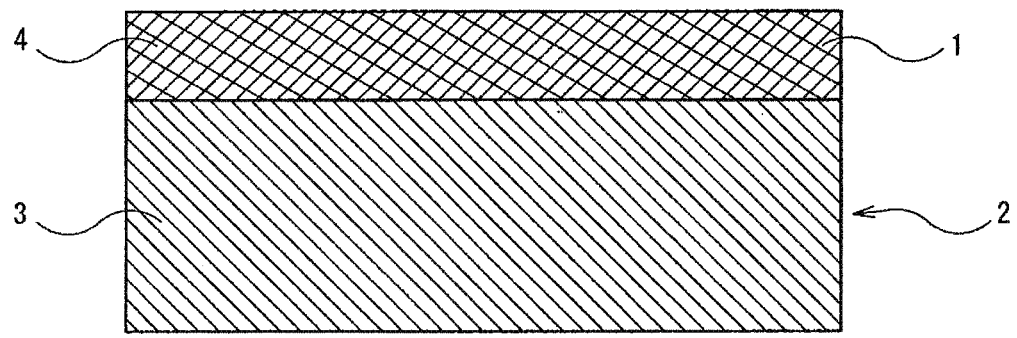
FIG. 1 is a schematic end view illustrating a semipermeable membrane according to an embodiment of the present invention.
Figure 2:
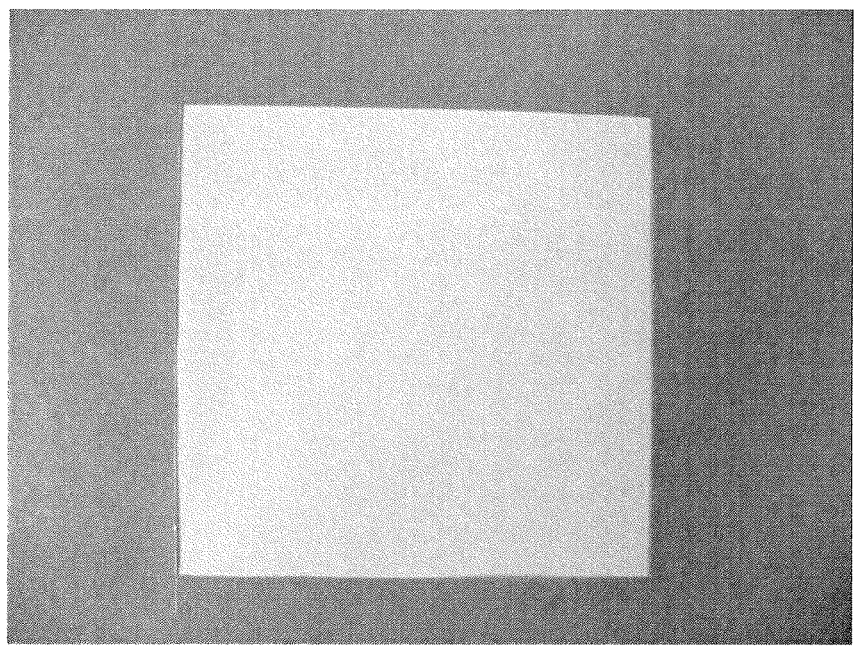
FIG. 2 is a photograph showing a state in which a semipermeable membrane of Example 1 is impregnated with hexane.
Figure 3:
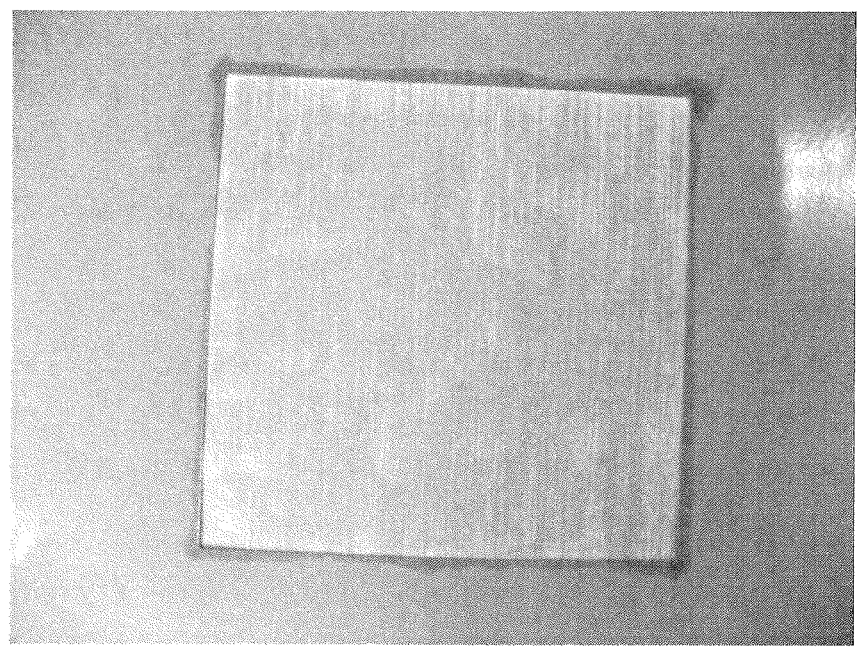
FIG. 3 is a photograph showing a state in which a semipermeable membrane of Comparative Example is impregnated with hexane.
Figure 4:
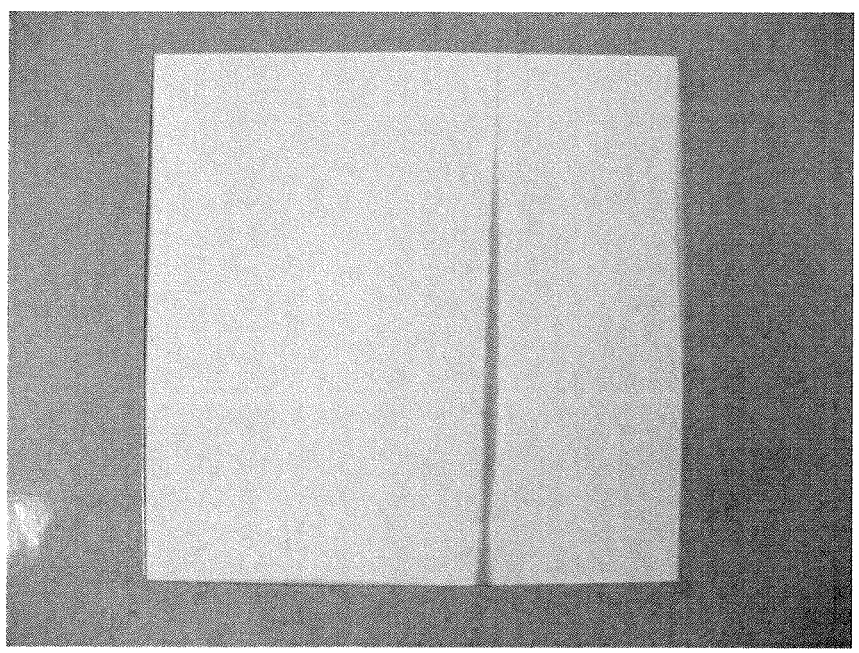
FIG. 4 is a photograph showing a state in which a semipermeable membrane of Reference Example is impregnated with hexane.

In order to improve the gas separation performance of the gas separation layer described above, it is necessary to reduce the thickness of the gas separation layer. However, a reduction in the thickness easily causes defects, such as cracks and pinholes, in the gas separation layer. Such defects degrade the function of the separation membrane.

However, in the related art described above, it is difficult to form a defect-free separation membrane having a thickness of several tens of micrometers or less and a pore diameter of less than 10 nm. Even if such a thin membrane is formed, it is difficult to handle the thin membrane.

The present invention has been made in view of the circumstances described above. An object of the present invention is to provide a semipermeable membrane having a good separation performance and capable of being relatively easily handled, and a method for producing the semipermeable membrane.

Advantageous Effects of Invention

The semipermeable membrane according to the present invention has a good separation performance and can be relatively easily handled. According to the method for producing the semipermeable membrane, such a semipermeable membrane can be easily and reliably produced.

Description of Embodiments of the Present Invention

A semipermeable membrane according to an embodiment of the present invention includes a semipermeable membrane layer containing an amorphous resin as a main component, and a sheet-like supporting body that supports the semipermeable membrane layer. In the semipermeable membrane, the supporting body has a porous first supporting layer and a porous second supporting layer laminated on one of surfaces of the first supporting layer, the second supporting layer has a smaller mean flow pore diameter than the first supporting layer, and the second supporting layer is impregnated with the semipermeable membrane layer.

According to the semipermeable membrane, the supporting body includes the first supporting layer and the second supporting layer having a smaller mean flow pore diameter than the first supporting layer, and the semipermeable membrane layer is formed by impregnating the second supporting layer with an amorphous resin. According to the semipermeable membrane, when the second supporting layer is impregnated with an amorphous resin by coating or the like, the resin is densely introduced, by capillarity, into the second supporting layer, which has smaller pores than the first supporting layer, to form a semipermeable membrane layer free of defects such as pinholes and cracks. Furthermore, according to the semipermeable membrane, even when the amount of amorphous resin impregnated is reduced, a dense membrane is formed in the second supporting layer, and thus a reduction in the thickness of the semipermeable membrane is easily realized. Furthermore, at least a part of the semipermeable membrane layer having such a reduced thickness is supported in the second supporting layer, and thus the semipermeable membrane is easily handled.

Furthermore, according to the semipermeable membrane, the semipermeable membrane layer contains an amorphous resin as a main component, and the amorphous resin has larger intermolecular gaps than crystalline resins. Thus, suitable gaps that allow molecules of a gas or the like to selectively pass can be formed easily and reliably. Accordingly, the semipermeable membrane has a good separation performance.

The term "amorphous resin" refers to a resin that does not have a crystalline structure, and refers to a resin having a degree of crystallinity of 5% or less as measured in accordance with JIS-K0050 (1996). The term "main component" refers to a component having the highest content, and refers to a component contained in an amount of, for example, 50% by mass or more. The "mean flow pore diameter" is an index corresponding to a mean value of the pore diameter and is determined from the results measured by the bubble point method (ASTM F316-86, JIS-K3832 (1990)) with a pore size distribution measuring instrument. Specifically, in the case where a membrane is dry and the case where the membrane is wet with a liquid, a relationship between a differential pressure applied to the membrane and a flow rate of air permeating through the membrane is measured by the bubble point method. The two graphs obtained by this measurement are referred to as a dry curve and a wet curve, respectively. A differential pressure at an intersection of the wet curve and a curve drawn by halving the flow rate in the dry curve is denoted by P (Pa). The "mean flow pore diameter" is a value d (μm) represented by a formula $d=c\gamma/P$ (where c represents a constant of 2,860 and γ represents a surface tension (dynes/cm) of the liquid).

A ratio of the mean flow pore diameter of the second supporting layer to the mean flow pore diameter of the first supporting layer is preferably $\frac{1}{1,000}$ or more and $\frac{1}{5}$ or less. When the semipermeable membrane has a ratio of the mean flow pore diameter of the second supporting layer to the mean flow pore diameter of the first supporting layer within the above range, the ease of formation of the semipermeable membrane layer can be enhanced, and the separation performance of the semipermeable membrane layer can be improved.

The mean flow pore diameter of the first supporting layer is preferably 0.05 μm or more and 20 μm or less, and the mean flow pore diameter of the second supporting layer is preferably 0.01 μm or more and 1 μm or less. When the semipermeable membrane includes the first supporting layer and the second supporting layer that have mean flow pore diameters within the above ranges, the ease of formation of the semipermeable membrane layer can be enhanced, and the strength of the supporting body and the separation performance of the semipermeable membrane can be improved.

The first supporting layer preferably has a bubble point of 10 kPa or more and 350 kPa or less, and the second supporting layer preferably has a bubble point of 500 kPa or more and 3,000 kPa or less. When the semipermeable membrane includes the first supporting layer and the second supporting layer that have bubble points within the above ranges, the ease of formation of the semipermeable membrane layer can be enhanced, and the strength of the supporting body and the separation performance of the semipermeable membrane can be improved. The term "bubble point" refers to a value measured by using isopropyl alcohol in accordance with ASTM F316-86.

The first supporting layer preferably has a porosity of 40% or more and 90% or less, and the second supporting layer preferably has a porosity of 30% or more and 80% or less. When the semipermeable membrane includes the first supporting layer and the second supporting layer that have porosities within the above ranges, the strength of the supporting body and the separation performance of the semipermeable membrane can be improved. The term "porosity" refers to a ratio of the area of pores in a section of a porous layer in an arbitrary direction.

The semipermeable membrane layer preferably has an average thickness of 0.2 μm or more and 10 μm or less. When the semipermeable membrane includes the semipermeable membrane layer having an average thickness within the above range, the strength of the semipermeable membrane layer and the separation performance can be improved.

The semipermeable membrane layer is preferably impregnated to an interface between the first supporting layer and the second supporting layer. When the semipermeable membrane includes the semipermeable membrane layer that is impregnated to the interface between the first supporting layer and the second supporting layer, the denseness of the semipermeable membrane layer can be increased, and a reduction in the thickness of the semipermeable membrane can be promoted.

The resin having an amorphous structure is preferably an amorphous fluororesin. When the semipermeable membrane includes the semipermeable membrane layer formed of an amorphous fluororesin, the separation performance of the semipermeable membrane layer can be improved, and weather resistance, chemical resistance, and the like of the semipermeable membrane layer can be enhanced.

The first supporting layer and the second supporting layer each preferably contain a fluororesin as a main component. When the semipermeable membrane includes the supporting body containing a fluororesin, the mechanical strength, weather resistance, chemical resistance, and the like of the supporting body can be enhanced.

The first supporting layer is preferably formed of an expanded film. When the semipermeable membrane includes the first supporting layer formed of an expanded film, the first supporting layer having suitable strength and a suitable mean flow pore diameter can be relatively easily formed.

A method for producing a semipermeable membrane according to another embodiment of the present invention is a method for producing a semipermeable membrane including a semipermeable membrane layer containing an amorphous resin as a main component, and a sheet-like supporting body that supports the semipermeable membrane layer. The method includes a laminating step of laminating a porous first supporting layer and a porous second supporting layer to prepare a sheet-like supporting body, a dispersion impregnation step of impregnating the supporting body with a dispersion of an amorphous resin, and a drying step of drying the supporting body impregnated with the dispersion. In the method, the second supporting layer has a smaller mean flow pore diameter than the first supporting layer.

In the method for producing a semipermeable membrane, the supporting body includes the first supporting layer and the second supporting layer having a smaller mean flow pore diameter than the first supporting layer, and the semipermeable membrane layer is formed by impregnating the second supporting layer with an amorphous resin. In the method for producing a semipermeable membrane, the second supporting layer is impregnated with the dispersion of an amorphous resin by coating or the like, and drying is then performed. As a result, the resin is densely introduced, by capillarity, into the second supporting layer, which has smaller pores than the first supporting layer, to form a semipermeable membrane layer free of defects such as pinholes and cracks. Furthermore, according to the method for producing a semipermeable membrane, even when the amount of amorphous resin impregnated is reduced, a dense membrane is formed in the second supporting layer, and thus a reduction in the thickness of the semipermeable membrane is easily realized. Furthermore, in the method for producing a semipermeable membrane, since at least a part of the semipermeable membrane layer having such a reduced thickness is supported in the second supporting layer, a semipermeable membrane that is easily handled is produced.

Furthermore, in the method for producing a semipermeable membrane, since an amorphous resin is used as a main component of the semipermeable membrane layer, the semipermeable membrane layer having suitable gaps that allow molecules of a gas or the like to selectively pass can be formed easily and reliably. Therefore, the method for producing a semipermeable membrane provides a semipermeable membrane having a good separation performance.

Details of Embodiment of the Present Invention

A semipermeable membrane and a method for producing a semipermeable membrane according to embodiments of the present invention will now be described in detail with reference to the drawings.

<Semipermeable Membrane>

The semipermeable membrane illustrated in FIG. 1 includes a semipermeable membrane layer 1 containing an amorphous resin as a main component, and a sheet-like supporting body 2 that supports the semipermeable membrane layer 1. The supporting body 2 has a porous first supporting layer 3 and a porous second supporting layer 4 that is laminated on one of surfaces of the first supporting layer 3. The second supporting layer 4 has a smaller mean flow pore diameter than the first supporting layer 3, and the second supporting layer 4 is impregnated with the semipermeable membrane layer 1.

In the semipermeable membrane, when the second supporting layer 4 is impregnated with an amorphous resin by coating or the like, the resin is densely introduced, by capillarity, into the second supporting layer 4, which has smaller pores than the first supporting layer 3, to form a semipermeable membrane layer 1 free of defects such as pinholes and cracks. Furthermore, in the semipermeable membrane, even when the amount of amorphous resin impregnated is reduced, a dense membrane is formed in the second supporting layer 4, and thus a reduction in the thickness of the semipermeable membrane is easily realized. Furthermore, at least a part of the semipermeable membrane layer 1 having such a reduced thickness is supported in the second supporting layer 4, and thus the semipermeable membrane is easily handled.

(First Supporting Layer)

The first supporting layer 3 is a porous membrane forming the supporting body 2 that supports the semipermeable membrane layer 1.

The material of the first supporting layer 3 is not particularly limited. However, the first supporting layer 3 preferably contains, as a main component, a fluororesin, which has good mechanical strength, weather resistance, chemical resistance, and the like. Examples of the fluororesin include polytetrafluoroethylene (PTFE), tetrafluoroethylene-perfluoroalkyl vinyl ether copolymers (PFA), tetrafluoroethylene-hexafluoropropylene copolymers (FEP), ethylene-tetrafluoroethylene copolymers (ETFE), and polyvinylidene fluoride (PVdF). Of these, polytetrafluoroethylene is preferred. These resins may be used alone or in combination of two or more thereof.

The first supporting layer 3 may contain a resin other than the resin serving as the main component and additives. The lower limit of the content of the resin serving as the main component is preferably 80% by mass and more preferably 90% by mass.

The average thickness of the first supporting layer 3 is not particularly limited. The lower limit of the average thickness of the first supporting layer 3 is preferably 1 μm and more preferably 10 μm. The upper limit of the average thickness of the first supporting layer 3 is preferably 200 vim and more preferably 100 μm. When the average thickness of the first supporting layer 3 is less than the lower limit, the supporting body 2 may have insufficient strength. In contrast, when the average thickness of the first supporting layer 3 exceeds the upper limit, the semipermeable membrane may have an unnecessarily large thickness.

The mean flow pore diameter of the first supporting layer 3 is larger than the mean flow pore diameter of the second supporting layer 4. The lower limit of the mean flow pore diameter of the first supporting layer 3 is preferably 0.05 μm, more preferably 0.1 μm, and still more preferably 0.2 μm. The upper limit of the mean flow pore diameter of the first supporting layer 3 is preferably 20 μm, more preferably 10 μm, and still more preferably 1 μm. When the mean flow pore diameter of the first supporting layer 3 is less than the lower limit, a pressure loss of the semipermeable membrane may increase. In contrast, when the mean flow pore diameter of the first supporting layer 3 exceeds the upper limit, the supporting body 2 may have insufficient strength.

The lower limit of the bubble point of the first supporting layer 3 is preferably 10 kPa, more preferably 50 kPa, and still more preferably 150 kPa. The upper limit of the bubble point of the first supporting layer 3 is preferably 350 kPa, more preferably 300 kPa, and still more preferably 250 kPa. When the bubble point of the first supporting layer 3 is less than the lower limit, the supporting body 2 may have insufficient strength. In contrast, when the bubble point of the first supporting layer 3 exceeds the upper limit, a pressure loss of the semipermeable membrane may increase.

The lower limit of the porosity of the first supporting layer 3 is preferably 40%, more preferably 50%, and still more preferably 60%. The upper limit of the porosity of the first supporting layer 3 is preferably 90% and more preferably 85%. When the porosity of the first supporting layer 3 is less than the lower limit, a pressure loss of the semipermeable membrane may increase. In contrast, when the porosity of the first supporting layer 3 exceeds the upper limit, the supporting body 2 may have insufficient strength.

The structure of the first supporting layer 3 is not particularly limited as long as the first supporting layer 3 is a porous body. The first supporting layer 3 preferably has a structure of an expanded film. Specifically, the first supporting layer 3 is preferably a layer obtained by expanding a nonporous resin film formed by extrusion or flow casting to make the nonporous resin film porous. Example of the expanded film include multi-axially expanded films and uniaxially expanded films. Uniaxially expanded films, which have good expansion processability, are preferred. Use of an expanded film as the first supporting layer 3 relatively easily provides a supporting layer 3 containing a fluororesin as a main component and having suitable strength and a suitable mean flow pore diameter.

An example of an applicable method for forming the first supporting layer 3 is a method including extruding a synthetic resin from a die that includes a cavity having, for example, a plurality of rod-shaped bodies and air ejection holes therein.

(Second Supporting Layer)

The second supporting layer 4 is a porous membrane impregnated with the semipermeable membrane layer 1 and directly supports the semipermeable membrane layer 1 as a skeleton of the semipermeable membrane layer 1. The second supporting layer 4 is laminated directly on one of the surfaces of the first supporting layer 3.

The material of the second supporting layer 4 is not particularly limited. However, as in the first supporting layer 3, the second supporting layer 4 preferably contains, as a main component, a fluororesin, which has good mechanical strength, weather resistance, chemical resistance, and the like, and preferably contains, as the main component, the same resin as the main component of the first supporting layer 3. The second supporting layer 4 may contain a resin other than the resin serving as the main component and additives. The lower limit of the content of the resin serving as the main component is preferably 80% by mass and more preferably 90% by mass.

The average thickness of the second supporting layer 4 is not particularly limited. The lower limit of the average thickness of the second supporting layer 4 is preferably 0.2 µm and more preferably 1 µm. The upper limit of the average thickness of the second supporting layer 4 is preferably 10 µm and more preferably 5 µm. When the average thickness of the second supporting layer 4 is less than the lower limit, the semipermeable membrane layer 1 having sufficient strength may not be formed. In contrast, when the average thickness of the second supporting layer 4 exceeds the upper limit, the semipermeable membrane may have an unnecessarily large thickness.

The mean flow pore diameter of the second supporting layer 4 is smaller than the mean flow pore diameter of the first supporting layer 3. The lower limit of a ratio of the mean flow pore diameter of the second supporting layer 4 to the mean flow pore diameter of the first supporting layer 3 is preferably 1/1,000, more preferably 1/500, and still more preferably 1/100. The upper limit of the ratio of the mean flow pore diameter is preferably 1/5, more preferably 1/6, and still more preferably 1/8. When the ratio of the mean flow pore diameter is less than the lower limit, the second supporting layer 4 has an excessively small mean flow pore diameter and it becomes difficult for the second supporting layer 4 to be impregnated with an amorphous resin forming the semipermeable membrane layer 1, or the first supporting layer 3 has an excessively large mean flow pore diameter and the supporting body 2 may have insufficient strength. In contrast, when the ratio of the mean flow pore diameter exceeds the upper limit, it becomes difficult to exhibit capillarity in the second supporting layer 4 and it may become difficult to form a dense semipermeable membrane layer 1.

The lower limit of the mean flow pore diameter of the second supporting layer 4 is preferably 0.01 µm, more preferably 0.02 µm, and still more preferably 0.03 µm. The upper limit of the mean flow pore diameter of the second supporting layer 4 is preferably 1 µm and more preferably 0.1 µm. When the mean flow pore diameter of the second supporting layer 4 is less than the lower limit, impregnation of the amorphous resin that forms the semipermeable membrane layer 1 may become difficult. In contrast, when the mean flow pore diameter of the second supporting layer 4 exceeds the upper limit, the supporting body 2 may have insufficient strength.

The lower limit of the bubble point of the second supporting layer 4 is preferably 500 kPa, more preferably 750 kPa, and still more preferably 1,000 kPa. The upper limit of the bubble point of the second supporting layer 4 is preferably 3,000 kPa, more preferably 2,000 kPa, and still more preferably 1,500 kPa. When the bubble point of the second supporting layer 4 is less than the lower limit, the supporting body 2 may have insufficient strength. In contrast, when the bubble point of the second supporting layer 4 exceeds the upper limit, impregnation of the amorphous resin that forms the semipermeable membrane layer 1 may become difficult.

The lower limit of the porosity of the second supporting layer 4 is preferably 30%, more preferably 50%, and still more preferably 70%. The upper limit of the porosity of the second supporting layer 4 is preferably 80% and more preferably 75%. When the porosity of the second supporting layer 4 is less than the lower limit, impregnation of the amorphous resin that forms the semipermeable membrane layer 1 may become difficult. In contrast, when the porosity of the second supporting layer 4 exceeds the upper limit, the supporting body 2 may have insufficient strength.

The lower limit of a ratio of the average thickness of the second supporting layer 4 to the average thickness of the supporting body 2 is preferably 0.02, more preferably 0.025, and still more preferably 0.03. The upper limit of the ratio is preferably 0.10, more preferably 0.09, and still more preferably 0.08. When the ratio is within the above range, the amorphous resin impregnated into the supporting body 2 can be made present mainly in the second supporting layer 4, and a semipermeable membrane layer 1 having a relatively small thickness can be formed.

The second supporting layer 4 preferably has high wettability to a solution containing an amorphous resin and a solvent compared with the first supporting layer 3. Herein, the term "high wettability" refers to a small static water contact angle measured in accordance with JIS-R3257 (1999). Regarding organic solvents, the term "high wettability" refers to a high wet state in the oil repellency test in AATCC 118.

The structure of the second supporting layer 4 is not particularly limited as long as the second supporting layer 4 is a porous body having a smaller mean flow pore diameter than the first supporting layer 3. The second supporting layer 4 can be easily and reliably formed by, for example, the method described below.

Hereinafter, a description will be given of a case where the second supporting layer 4 is prepared by using a fluororesin powder. However, the method for preparing the second supporting layer 4 is not limited thereto.

First, a fluororesin-containing liquid prepared by mixing a fluororesin powder in a solvent is applied onto a smooth film. The method for applying the fluororesin-containing liquid include, but are not particularly limited to, a method in which a smooth film is simply coated with a fluororesin-containing liquid and a method in which a first supporting layer 3 is used and a fluororesin-containing liquid is poured between the first supporting layer 3 and a smooth film.

In the case of the method in which a fluororesin-containing liquid is poured between a first supporting layer 3 and a smooth film, after the first supporting layer 3 is coated with the fluororesin-containing liquid, it is preferable to cover a portion of the first supporting layer 3, the portion being impregnated with the fluororesin-containing liquid, with a smooth film so as to prevent air bubbles from entering. As a result, the fluororesin-containing liquid can be disposed between the first supporting layer 3 and the smooth film.

In coating a smooth film or a first supporting layer 3 with a fluororesin-containing liquid, coating machines using a capillary method, a roll method, a die (lip) method, a slit method, or a bar method can be used as coating machines. In particular, in order to form a thin-membrane second supporting layer 4, coating machines using a capillary method, a die method, a slit method, or a bar method are preferred, and a coating machine using a capillary method is more preferred. The coating machine using a capillary method enables the accuracy of the membrane thickness to improve because the second supporting layer 4 can be formed as a thin membrane and non-contact coating using capillarity can be performed.

After a smooth film is coated with a fluororesin-containing liquid, or after a first supporting layer 3 is coated with a fluororesin-containing liquid and a portion of the first supporting layer 3, the portion being impregnated with the fluororesin-containing liquid, is covered with a smooth film, a dispersion medium contained in the fluororesin-containing liquid is dried. The drying can be conducted by heating to a temperature close to a boiling point of the dispersion medium or a temperature equal to or higher than the boiling point of the dispersion medium. A coating film containing the fluororesin powder is formed by drying. This coating film is sintered by heating to a temperature equal to or higher than the melting point of the fluororesin, to thereby prepare a second supporting layer 4. The drying and the sintering may be conducted in the same step.

After the formation of the second supporting layer 4 in this manner, the smooth film on the second supporting layer 4 is removed. The removal method is not particularly limited. When the smooth film is a metal foil, an example of the method includes removing the smooth film by dissolving with an acid or the like.

An aqueous medium such as water is typically used as the dispersion medium. The above fluororesin powder is an aggregate of fluororesin fine particles and can be obtained by, for example, emulsion polymerization. The lower limit of the content of the fluororesin powder in the fluororesin-containing liquid is preferably 15% by mass, more preferably 20% by mass, and still more preferably 25% by mass. The upper limit of the content is preferably 75% by mass, more preferably 70% by mass, and still more preferably 65% by mass. When the content of the fluororesin powder is less than the lower limit, the second supporting layer 4 may have insufficient strength. In contrast, when the content exceeds the upper limit, the second supporting layer 4 has an excessively small mean flow pore diameter, and a pressure loss of the semipermeable membrane may increase.

The fluororesin-containing liquid is preferably a liquid prepared by dispersing a fluororesin powder containing PTFE as a main component in a dispersion medium. Use of a fluororesin-containing liquid containing PTFE as a main component can provide a second supporting layer 4 having, for example, good chemical resistance and heat resistance.

The fluororesin-containing liquid is preferably a fluororesin-containing liquid prepared by dispersing a mixture containing a PTFE powder and a thermoplastic fluororesin powder in a dispersion medium. A fluororesin-containing liquid containing a PTFE powder as a main component in the mixture is more preferred. Use of such a fluororesin-containing liquid can provide a denser second supporting layer 4. As a result, it is possible to obtain a second supporting layer 4 having, for example, a higher effect of suppressing permeation of a gas, water vapor, an organic solvent, and the like at high temperatures. Examples of the thermoplastic fluororesin include PFA, FEP, tetrafluoroethylene-hexafluoropropylene-perfluoroalkyl vinyl ether copolymers (EPA), and ETFE. Of these, PFA is preferred. Since pyrolysis of PFA is unlikely to proceed, defects generated in the second supporting layer 4 can be reduced. These resins may be used alone or as a mixture of two or more thereof.

The upper limit of the amount of the thermoplastic fluororesin powder contained in the mixture of the PTFE powder and the thermoplastic fluororesin powder is preferably 37% by volume, more preferably 20% by volume, and still more preferably 10% by volume. When the amount of the thermoplastic fluororesin powder mixed is more than the upper limit and, for example, the mixture is applied to a first supporting layer 3 which is a porous body, the thermoplastic fluororesin contained in the mixture is aggregated on, for example, a skeleton portion of the porous body due to the surface tension thereof, and defects may be easily generated.

The defects described above can also be reduced by adding a water-soluble polymer that turns into a gel under a high-concentration condition to a fluororesin powder containing PTFE as a main component. The effect can be enhanced by adding the above-described thermoplastic fluororesin and this water-soluble polymer to the fluororesin-containing liquid.

When this water-soluble polymer is a nonionic polymer, the water-soluble polymer does not affect dispersibility of the fluororesin, or the influence on the dispersibility of the fluororesin is small. Accordingly, the water-soluble polymer is preferably a nonionic polymer rather than an anionic polymer and cationic polymer. The lower limit of the weight-average molecular weight of the nonionic water-soluble polymer is preferably 5,000, more preferably 10,000, and still more preferably 15,000. When the weight-average molecular weight is equal to or more than the lower limit, the water-soluble polymer turns into a gel to form a membrane before water is completely removed during drying, and thus the formation of cracks due to the surface tension of water can be suppressed. Of these, nonionic water-soluble polymers having a molecular weight of 10,000 or more are preferred. Examples of such water-soluble polymers include polyethylene oxide, polypropylene oxide, polyvinyl alcohol, starch, and agarose. Of these, polyethylene oxide and polypropylene oxide are preferred, and polyethylene oxide is particularly preferred. These water-soluble polymers may be used alone or as a mixture of two or more thereof. Herein, the term "weight-average molecular weight" refers to a weight-average molecular weight determined by gel permeation chromatography in terms of standard polystyrene.

The lower limit of the content of the water-soluble polymer in the fluororesin-containing liquid is preferably 0.5 mg/mL, more preferably 1.0 mg/mL, and still more preferably 5.0 mg/mL. The upper limit of the content of the water-soluble polymer is preferably 35 mg/mL, more preferably 30 mg/mL, and still more preferably 25 mg/mL. When the content of the water-soluble polymer is less than the lower limit, the effect achieved by incorporating the water-soluble polymer in the fluororesin-containing liquid may not be sufficiently exerted. In contrast, when the content of the water-soluble polymer is more than the upper limit, the fluororesin-containing liquid has an excessively high viscosity, and handleability of the fluororesin-containing liquid may decrease.

A coating jig of a coating machine may directly come in contact with a surface of a smooth film and damage the film surface depending on the method for applying the fluororesin-containing liquid and variations in the thickness and bending of the smooth film. Consequently, scratches on the film surface are transferred to the second supporting layer 4, resulting in the formation of surface irregularities or generation of defects such as pinholes. To prevent this, a particular amount of an anionic surfactant is preferably added as a lubricant to the fluororesin-containing liquid. The lower limit of the amount of the anionic surfactant added is preferably 0.5 mg/mL, more preferably 1.5 mg/mL, and still more preferably 2.5 mg/mL. The upper limit of the amount added is preferably 30 mg/mL, more preferably 20 mg/mL, and still more preferably 10 mg/mL. When the amount added is equal to or more than the lower limit, the coefficient of friction of the second supporting layer 4 can be reduced. The generation of surface irregularities and defects such as pinholes can be thereby suppressed. In contrast, when the amount added is more than the upper limit, the fluororesin-containing liquid may have an excessively high viscosity, and a problem such as aggregation of the fluororesin may easily occur. Furthermore, when the amount added is more than the upper limit, a decomposition residue may remain in the second supporting layer 4, and a change in color may easily occur.

Examples of the anionic surfactant include carboxylic acid ester-type surfactants such as polyoxyethylene alkyl ether carboxylates, sulfuric acid ester-type surfactants such as polyoxyethylene alkyl ether sulfonates, and phosphoric acid ester-type surfactants such as polyoxyethylene alkyl ether phosphates. However, addition of an anionic surfactant decreases dispersibility of the fluororesin powder. Accordingly, in the case where such an anionic surfactant is mixed, preferably, after the mixing, the production is completed within a time during which sedimentation, separation, or the like does not occur, or the production is performed while vibrations such as ultrasonic waves are continuously applied.

(Semipermeable Membrane Layer)

The semipermeable membrane layer 1 contains an amorphous resin as a main component, and at least a part of the semipermeable membrane layer 1 in a thickness direction is impregnated into the second supporting layer 4.

Since the amorphous resin has larger intermolecular gaps than crystalline resins, suitable gaps that allow molecules of a gas or the like to selectively pass can be formed easily and reliably. Accordingly, the semipermeable membrane has a good separation performance. The size of fine pores in the semipermeable membrane layer 1 depends on the intermolecular gaps of the amorphous resin. Therefore, the amorphous resin may be any amorphous resin that has a molecular weight in a particular range and that does not polymerize during, for example, curing of the semipermeable membrane layer 1. Accordingly, various types of resins can be selected as the amorphous resin in the semipermeable membrane.

Examples of the amorphous resin include rubbers and elastomers such as silicone rubber and fluorine rubber; amorphous fluororesins, polyimides, cellulose, polysulfones, and polyaramids. Of these, amorphous fluororesins, which easily enhance, for example, mechanical strength, weather resistance, and chemical resistance of the supporting body, are preferred.

The lower limit of the weight-average molecular weight of the amorphous resin is preferably 10,000, more preferably 50,000, and still more preferably 100,000. The upper limit of the weight-average molecular weight is preferably 5,000,000, more preferably 1,000,000, and still more preferably 500,000. When the weight-average molecular weight is less than the lower limit, the strength of the semipermeable membrane layer 1 may decrease. In contrast, when the weight-average molecular weight exceeds the upper limit, an amorphous resin solution has a high viscosity, and an impregnation property may decrease. A weight-average molecular weight within the above range can further improve the separation performance of the semipermeable membrane.

The lower limit of the glass transition point of the amorphous resin is preferably 30° C., more preferably 60° C., and still more preferably 90° C. The upper limit of the glass transition point is preferably 350° C., more preferably 250° C., and still more preferably 150° C. A glass transition point within the above range enables handleability of the semipermeable membrane to improve. Herein, the term "glass transition point" refers to a temperature measured in accordance with JIS-K7121 (1987).

The upper limit of the degree of crystallinity of the amorphous resin is preferably 5.0%, more preferably 4.5%, and still more preferably 4.0%. The lower limit of the degree of crystallinity is not particularly limited but is preferably 0.5%. When the degree of crystallinity is equal to or less than the upper limit, it is possible to obtain the semipermeable membrane layer 1 having suitable gaps that allow molecules of a gas or the like to selectively pass.

The lower limit of the water contact angle of the amorphous resin is preferably 95°, more preferably 100°, and still more preferably 105°. The upper limit of the water contact angle is preferably 125°, more preferably 120°, and still more preferably 115°. A water contact angle within the above range can provide the semipermeable membrane layer 1 that has high water repellency and that does not have an influence of moisture absorption. Herein, the term "water contact angle of the amorphous resin" refers to an angle formed by the free surface of water and a surface of the amorphous resin in a state where the water and the amorphous resin are in contact with each other. The water contact angle of the amorphous resin is measured in accordance with the sessile drop method specified in JIS-R3257 (1999).

The entire second supporting layer 4 may be impregnated with the semipermeable membrane layer 1 as illustrated in FIG. 1. Alternatively, only a part of the second supporting layer 4 in the thickness direction may be impregnated with the semipermeable membrane layer 1. Alternatively, the second supporting layer 4 may have a portion that is not impregnated with the semipermeable membrane layer 1 in the thickness direction. In FIG. 1, the semipermeable membrane layer 1 and the second supporting layer 4 have the same average thickness. However, the average thickness of the semipermeable membrane layer 1 need not be necessarily the same as that of the supporting body 2. The average thickness of the semipermeable membrane layer 1 may be smaller than the average thickness of the second supporting layer 4 or larger than the average thickness of the second supporting layer 4. However, the semipermeable membrane layer 1 is preferably impregnated to the interface between the first supporting layer 3 and the second supporting layer 4. When the semipermeable membrane layer 1 is impregnated to the interface between the first supporting layer 3 and the second supporting layer 4, the denseness of the semipermeable membrane layer 1 of the semipermeable membrane can be increased, and a reduction in the thickness of the semipermeable membrane can be promoted.

The average thickness of the semipermeable membrane layer 1 is not particularly limited. The lower limit of the average thickness of the semipermeable membrane layer 1 is preferably 0.2 μm and more preferably 0.5 μm. The upper limit of the average thickness of the semipermeable membrane layer 1 is preferably 10 μm and more preferably 5 μm. When the average thickness of the semipermeable membrane layer 1 is less than the lower limit, molecule of a gas or the like easily permeate and the separation performance may degrade, or the semipermeable membrane layer 1 may have insufficient strength. In contrast, when the average thickness of the semipermeable membrane layer 1 exceeds the upper limit, it becomes difficult for molecules of a gas or the like to permeate, and the separation efficiency may decrease.

(Air Permeability of Semipermeable Membrane)

The lower limit of the Gurley second of the semipermeable membrane is preferably 6,000 seconds, more preferably 7,000 seconds, and still more preferably 8,000 seconds. The upper limit of the Gurley second is not particularly limited. The larger the value of the Gurley second, the better. When the Gurley second is equal to or more than the lower limit, the selectivity of a gas or the like that is separated by the semipermeable membrane can be improved.

Herein, the term "Gurley second" refers to a numerical value representing an air permeability (amount of air permeation) determined in accordance with JIS-P8117 (2009). Specifically, the Gurley second represents a time (sec) taken for 100 mL of air to pass through an area of 645 $cm^2$. When a thin membrane has defects, the Gurley second is small because air permeates through the defects. With a decrease in the defects, air becomes unlikely to permeate, and the Gurley second increases.

When defects of a thin membrane are very small, in some cases, the defects cannot be sufficiently detected only by measuring the Gurley second. Such very small defects can be checked by a method for examining permeability through a fluororesin membrane by using a liquid having a relatively low surface tension, such as an alcohol, an ether, a paraffin, or a fluorinated polyether. The presence or absence of such very small defects that are not detected by the measurement of the Gurley second can be detected by, for example, an IPA permeation test which includes applying isopropanol (IPA), at room temperature and at normal pressure, onto a surface of a membrane that is horizontally disposed, and determining the presence or absence of IPA that naturally passes through the inside of the membrane due to capillarity and gravity and reaches the lower surface of the membrane.

The IPA permeation test is specifically conducted by uniformly applying 10 mL of IPA with a brush onto a membrane having an area of 273 $cm^2$ and having a lower surface with which filter paper is brought into contact, and, 30 seconds later, observing the occurrence or nonoccurrence of adsorption of IPA on the filter paper by the naked eyes to detect the occurrence or nonoccurrence of permeation of IPA.

<Method for Producing Semipermeable Membrane>

A method for producing the semipermeable membrane includes a laminating step of laminating a porous first supporting layer and a porous second supporting layer to prepare a sheet-like supporting body, a dispersion impregnation step of impregnating the supporting body with a dispersion of an amorphous resin, and a drying step of drying the supporting body impregnated with the dispersion. In the method for producing the semipermeable membrane, the second supporting layer has a smaller mean flow pore diameter than the first supporting layer.

In the method for producing the semipermeable membrane, the second supporting layer is impregnated with the dispersion of the amorphous resin by coating or the like, and drying is then conducted. Consequently, the resin is densely introduced into the second supporting layer, which has smaller pores than the first supporting layer, to form a semipermeable membrane layer free of defects such as pinholes and cracks. Furthermore, in the method for producing the semipermeable membrane, even when the amount of amorphous resin impregnated is reduced, a dense membrane is formed in the second supporting layer, and thus a reduction in the thickness of the semipermeable membrane is easily realized. Furthermore, at least a part of the semipermeable membrane layer having such a reduced thickness is supported in the second supporting layer, and thus a semipermeable membrane that is easily handled is produced.

(Laminating Step)

The method for laminating the first supporting layer and the second supporting layer is not particularly limited. Examples thereof include a method in which a first supporting layer and a second supporting layer are individually produced, and the first supporting layer and the second supporting layer are then bonded to each other by thermocompression bonding, a method in which a resin solution is applied to a surface of one of a first supporting layer and a second supporting layer and is dried to form the other layer on the one of the layers, and a method in which a resin solution is poured between a first supporting layer and a film and is dried, and the film is then removed to form a second supporting layer on the first supporting layer.

Of these, the method in which a first supporting layer and a second supporting layer are individually produced, and the first supporting layer and the second supporting layer are then bonded to each other by thermocompression bonding is preferred. A supporting body that includes a first supporting layer and a second supporting layer that have fine pores is easily obtained by employing this method.

Specifically, a first supporting layer and a second supporting layer are arranged so as to overlap with each other and heated at a temperature equal to or higher than the melting point of a resin serving as a main component of the first supporting layer or the second supporting layer under pressure, to thereby fusion-bond the first supporting layer and the second supporting layer to each other. Herein, the term "melting point" refers to a higher melting point out of a melting point of the first supporting layer and a melting point of the second supporting layer.

The lower limit of the heating temperature is preferably the same temperature as the melting point and more preferably a temperature 5° C. higher than the melting point. The upper limit of the heating temperature is preferably a temperature 20° C. higher than the melting point and more preferably a temperature 10° C. higher than the melting point. When the heating temperature is lower than the lower limit, the adhesive strength between the first supporting layer and the second supporting layer may become insufficient. In contrast, when the heating temperature exceeds the upper limit, the first supporting layer and the second supporting layer may be melted. The upper limit of the pressure during heating is, for example, 100 kPa or more and 1,000 kPa or less.

(Dispersion Impregnation Step)

In the dispersion impregnation step, the second supporting layer is impregnated with an amorphous resin by, for example, applying a dispersion containing the amorphous resin. A dispersion containing an amorphous resin and an organic solvent can be suitably used as the dispersion. When an amorphous fluororesin is used as the amorphous resin, a fluorine-based solvent is suitably used as the organic solvent.

The lower limit of the content of the amorphous resin in the dispersion is preferably 0.1% by mass and more preferably 1% by mass. The upper limit of the content of the amorphous resin is preferably 20% by mass and more preferably 10% by mass. When the content of the amorphous resin is less than the lower limit, the efficiency of the formation of the semipermeable membrane layer may decrease. In contrast, when the content of the amorphous resin exceeds the upper limit, the viscosity of the dispersion increases, and it may become difficult for the second supporting layer to be impregnated with the amorphous resin.

The lower limit of the viscosity of the dispersion is preferably 10 mPa·s, more preferably 50 mPa·s, and still more preferably 100 mPa·s. The upper limit of the viscosity of the dispersion is preferably 10,000 mPa·s, more preferably 5,000 mPa·s, and still more preferably 2,000 mPa·s. When the viscosity of the dispersion is less than the lower limit, the semipermeable membrane layer may not be densified. In contrast, when the viscosity of the dispersion exceeds the upper limit, the viscosity of the dispersion increases, and it may become difficult for the second supporting layer to be impregnated with the amorphous resin.

The surface tension of the dispersion is preferably lower than the critical surface tension of the second supporting layer. In this case, the second supporting layer is easily impregnated with the dispersion. The critical surface tension of the second supporting layer refers to a wetting tension measured in accordance with JIS-K6768 (1999).

The average coating thickness (wet thickness) of the dispersion is determined on the basis of the average thickness of the semipermeable membrane layer to be formed. The average coating thickness may be, for example, 1 μm or more and 50 μm or less.

(Drying Step)

After the application of the dispersion, the supporting body impregnated with the dispersion is dried to remove the solvent. Thus, the second supporting layer impregnated with a semipermeable membrane layer is obtained. Preferably, an annealing treatment is further performed after drying.

The supporting body may be dried at room temperature (for example, 25° C.). The lower limit of the temperature of the annealing treatment is preferably 150° C. and more preferably 180° C. The upper limit of the temperature of the annealing treatment is preferably 300° C. and more preferably 250° C. The lower limit of the time of the annealing treatment is preferably 10 minutes and more preferably 20 minutes. The upper limit of the time of the annealing treatment is preferably 1 hour and more preferably 40 minutes. When the temperature of the annealing treatment is lower than the lower limit or the time of the annealing treatment is shorter than the lower limit, the denseness of the semipermeable membrane layer may decrease. In contrast, when the temperature or the time of the annealing treatment exceeds the upper limit, the supporting body and the semipermeable membrane layer may be deformed or damaged by heating.

The surface of the second supporting layer to which the dispersion is to be applied is preferably subjected to surface modification in advance. Examples of the surface modification include coating with a surface modifier and a plasma treatment. An example of the surface modifier is a silane coupling agent.

Other Embodiments

It is to be understood that the embodiments disclosed herein are only illustrative and are not restrictive in all respects. The scope of the present invention is not limited to the configurations of the embodiments and is defined by the claims described below. The scope of the present invention is intended to cover all the modifications within the meaning and scope of the claims and their equivalents.

The semipermeable membrane may include a supporting body having a plurality of first supporting layers and/or a plurality of second supporting layers. In such a case, the semipermeable membrane is preferably configured so that the semipermeable membrane layer is sandwiched between a pair of second supporting layers. The supporting body may have a layer other than the first supporting layer and the second supporting layer.

The semipermeable membrane can be suitably used not only as a gas separation membrane but also as a separation membrane such as a reverse osmosis membrane (RO membrane).

As for a gas separation membrane, since the semipermeable membrane has an oxygen-enriching function, the semipermeable membrane can be used in oxygen generators for, for example, oxygen inhalation healing of respiratory diseases (such as an oxygen capsule and an air conditioner), an improvement in the combustion efficiency of combustion engines, and a diaphragm for a NOx decrease oxygen sensor (protection of a sensor from an acidic substance larger than oxygen, such as $H_2S$).

Since the semipermeable membrane has a carbon dioxide-enriching function, the semipermeable membrane can be used in carbon dioxide generators for, for example, a greenhouse and cultivation of seaweed, aquatic plants, or the like. Furthermore, since the semipermeable membrane has a nitrogen-enriching function, the semipermeable membrane can be used in nitrogen generators for, for example, analysis and inert gas purging in various processes.

The semipermeable membrane is applicable to, for example, a methane concentrator that separates carbon dioxide and methane from natural gas or biogas, a hydrogen extraction apparatus that extracts hydrogen from a mixed gas of carbon dioxide and hydrogen generated in natural gas reforming, a coal gasification method, or the like, and a carbon dioxide extraction apparatus that extracts carbon dioxide from exhaust gas containing carbon dioxide and nitrogen, the exhaust gas being generated from a thermal power plant or the like. This carbon dioxide extraction contributes to a countermeasure to warming and production of dry ice.

EXAMPLES

The present invention will now be described more specifically by way of Examples. However, the present invention is not limited to the Examples described below.

Example 1

An expanded polytetrafluoroethylene (PTFE) film having a mean flow pore diameter of 0.45 μm and an average thickness of 70 µm ("Poreflon (registered trademark) FP-045-80" available from Sumitomo Electric Fine polymer, Inc.) was used as a first supporting layer.

Next, a second supporting layer was formed as follows. A PTFE dispersion ("AD911" available from Asahi Glass Co., Ltd.), a perfluoromethyl vinyl ether copolymer (MFA) latex, and a tetrafluoroethylene-perfluoroalkyl vinyl ether (PFA) copolymer dispersion ("920HP" available from E. I. du Pont de Nemours and Company) were mixed. The mixing ratio of these components was determined such that the volume ratio of a fluororesin solid content represented by MFA/(PTFE+MFA+PFA) and the volume ratio of a fluororesin solid content represented by PFA/(PTFE+MFA+PFA) were each 2%. Polyethylene oxide (weight-average molecular weight: 2,000,000) and triethanolamine polyoxyethylene alkyl ether sulfate ("EMAL 20T" available from Kao Corporation) were added to the resulting mixture such that the concentrations of the polyethylene oxide and the triethanolamine polyoxyethylene alkyl ether sulfate were 3 mg/mL and 10 mg/mL, respectively, to prepare a fluororesin dispersion.

Subsequently, an aluminum foil having an average thickness of 50 µl was spread and fixed on a flat glass plate so as not to form wrinkles. The fluororesin dispersion prepared as described above was dripped onto the aluminum foil. The fluororesin dispersion was then spread over one of surfaces of the aluminum foil so as to be uniform by rolling a slide shaft ("Stainless Fine Shaft SNSF type", outer diameter: 20 mm, made of stainless steel, available from Nippon Bearing Co., Ltd.).

The foil to which the fluororesin dispersion was applied was dried at 80° C. for 60 minutes, subsequently heated at 250° C. for one hour, and further heated at 340° C. for one hour. The foil was then naturally cooled to form a second supporting layer on the one surface of the aluminum foil. The second supporting layer had a mean flow pore diameter of 0.055 µm and an average thickness of 2.6 µm.

Next, the lamination of the first supporting layer and the second supporting layer will be described. The above PFA copolymer dispersion was diluted with distilled water by 4-fold in terms of volume. The polyethylene oxide and the triethanolamine polyoxyethylene alkyl ether sulfate were added thereto such that the concentrations of the polyethylene oxide and the triethanolamine polyoxyethylene alkyl ether sulfate were 3 mg/mL and 10 mg/mL, respectively, to prepare a diluted PFA dispersion.

Next, the laminate of the second supporting layer and the aluminum foil was spread and fixed on a flat glass plate so as not to form wrinkles such that the second supporting layer is located on the upper side. The diluted PFA dispersion prepared as described above was dripped thereon. Subsequently, the diluted PFA dispersion was spread over the second supporting layer so as to be uniform by using the slide shaft. Before this applied film was dried, the first supporting layer was placed thereon. The resulting laminate of the aluminum foil, the second supporting layer, and the first supporting layer was dried at 80° C. for 60 minutes, subsequently heated at 250° C. for one hour, further heated at 320° C. for one hour, and lastly heated at 317.5° C. for 8 hours. After the drying and heating, the aluminum foil was removed by dissolving in hydrochloric acid to prepare a laminate of the first supporting layer and the second supporting layer.

An amorphous fluororesin dispersion ("Cytop (registered trademark) CTX809" available from Asahi Glass Co., Ltd.) serving as an amorphous resin dispersion was applied to a surface of the laminate of the first supporting layer and the second supporting layer, the surface being disposed on the second supporting layer side, so as to have an average thickness of 30 µm. The entire second supporting layer was impregnated with this amorphous fluororesin dispersion. After the application, the resulting laminate was dried at room temperature for 15 minutes, at 50° C. for 15 minutes, and at 80° C. for 30 minutes, and subsequently subjected to an annealing treatment at 200° C. for 30 minutes to form a semipermeable membrane layer having an average thickness of 2.6 µm.

Comparative Example

The same expanded PTFE film as that used in Example 1 was used as a first supporting layer. The same amorphous fluororesin dispersion as that used in Example 1 was applied to one of surfaces of the expanded PTFE film so as to have an average thickness of 30 µm. The entire first supporting layer was impregnated with this amorphous fluororesin dispersion. After the application, the resulting film was dried at room temperature for 15 minutes, at 50° C. for 15 minutes, and at 80° C. for 30 minutes, and subsequently subjected to an annealing treatment at 200° C. for 30 minutes to form a semipermeable membrane layer having an average thickness of 2.6 µm.

Reference Example

A laminate of a first supporting layer and a second supporting layer was prepared as in Example 1, and scratches were formed with a needle on a surface of the laminate, the surface being disposed on the second supporting layer side. Subsequently, the same amorphous fluororesin dispersion as that used in Example 1 was applied to the surface of the second supporting layer of the laminate so as to have an average thickness of 30 µm. The entire second supporting layer was impregnated with this amorphous fluororesin dispersion. After the application, the resulting laminate was dried at room temperature for 15 minutes, at 50° C. for 15 minutes, and at 80° C. for 30 minutes, and subsequently subjected to an annealing treatment at 200° C. for 30 minutes to form a semipermeable membrane layer having an average thickness of 2.6 µm.

<Observation of Appearance of Semipermeable Membrane>

The semipermeable membranes of Example 1, Comparative Example, and Reference Example were each visually observed from one surface side to examine whether the membrane was glossy or not.

<SEM Observation of Section of Semipermeable Membrane>

Sections of the semipermeable membranes of Example 1, Comparative Example, and Reference Example were each observed with a SEM to examine the state of the sections.

<Defect Inspection of Semipermeable Membrane>

The presence or absence of defects contained in each of the semipermeable membranes of Example 1, Comparative Example, and Reference Example was examined. Hexane was used in this inspection. Regarding the semipermeable membranes of Example 1 and Reference Example, hexane was applied to a surface on the second supporting layer side. On the other hand, regarding the semipermeable membrane of Comparative Example, hexane was applied to one of surfaces of the first supporting layer. When hexane permeates through a semipermeable membrane and the semipermeable membrane becomes translucent, the semipermeable membrane is determined to have defects.

<Air Permeability>

Air permeability of each of the semipermeable membranes of Example 1, Comparative Example, and Reference Example was measured. The air permeability was measured at 20 points in accordance with JIS-P8117 (2009) and determined by averaging the measured values.

Table 1 shows the results.

TABLE 1

| | Appearance observation | Section observation by SEM | Defect inspection | Air permeability (Gurley seconds) |
|---|---|---|---|---|
| Example 1 | One of surfaces of the gas separation membrane was glossy. | A nonporous layer having an average thickness of 2.6 μm was observed. | Hexane did not permeate through the gas separation membrane, and the membrane did not become translucent. | Infinite (∞) |
| Comparative Example | One of surfaces of the gas separation membrane was glossy. | The entire gas separation membrane was formed of a porous layer. | Hexane permeated through the gas separation membrane, and the entire surface of the membrane became translucent. | 500 |
| Reference Example | One of surfaces of the gas separation membrane was glossy. | A nonporous layer having an average thickness of 2.6 μm was observed. However, portions in which scratches were formed were porous. | Hexane permeated through only portions in which scratches were formed, and the portions of the gas separation membrane became translucent. | 5000 |

<Selective Permeability of Semipermeable Membrane>

As in Example 1, a semipermeable membrane including a semipermeable membrane layer having an average thickness of 5 μm and a supporting body having an average thickness of 25 μm was prepared as Example 2. Selective permeability of gases was examined by using the semipermeable membrane of Example 2. Table 2 shows permeation rates and permeability coefficients of helium, nitrogen, and methane. Table 3 shows a separation factor of helium and nitrogen, a separation factor of helium and methane, and a separation factor of nitrogen and methane. The separation factors can each be determined by dividing a permeation rate of one of two types of gases by a permeation rate of the other gas. Here, the experiments of the selective permeability of the semipermeable membrane were conducted in accordance with JIS-K7126 (2006). The differential pressure between the pressurization side and the depressurization side of the semipermeable membrane was 94.5 cmHg, and the permeation area of the semipermeable membrane was 15.2 cm².

TABLE 2

| | | Helium | Nitrogen | Methane |
|---|---|---|---|---|
| Example 2 | Permeation rate $10^5$ cc/m² · 24 hours · atm | 127 | 2.01 | 1.99 |
| | Permeability coefficient $10^{-10}$ cc(STP) · cm/cm² · s · cmHg | 150 | 2.3 | 2.3 |

TABLE 3

| Separation factor | | |
|---|---|---|
| He/N$_2$ | He/CH$_4$ | N$_2$/CH$_4$ |
| 63 | 64 | 1.01 |

Tables 2 and 3 show that helium can selectively permeate through the semipermeable membrane.

Furthermore, a semipermeable membrane including a semipermeable membrane layer having an average thickness of 1.8 μm and a supporting body having an average thickness of 25 μm was prepared as in Example 1. Subsequently, different types of mixed gases were supplied into the semipermeable membrane as Examples 3 to 5, and selective permeability of each of the gases was examined as in Example 2. Table 4 shows the permeation rate and the permeability coefficient of each gas. Table 5 summarizes separation factors between the gases in Examples 3 to 5. Furthermore, Table 6 shows volume ratios of components before separation of the mixed gases supplied into the semipermeable membrane in the Examples and volume ratios of the components after separation. The differential pressure between the pressurization side and the depressurization side of the semipermeable membrane was 94.1 cmHg in Example 3 and was 94.5 cmHg in Examples 4 and 5. The permeation area of the semipermeable membrane was 15.2 cm².

TABLE 4

| | | Hydrogen | Carbon dioxide | Oxygen | Nitrogen | Methane |
|---|---|---|---|---|---|---|
| Example 3 | Permeation rate $10^5$ cc/m² · 24 hours · atm | — | 6.80 | 2.30 | 0.69 | — |
| | Permeability coefficient $10^{-10}$ cc(STP) · cm/cm² · s · cmHg | — | 19 | 6.3 | 1.9 | — |
| Example 4 | Permeation rate $10^5$ cc/m² · 24 hours · atm | — | 6.10 | — | — | 0.30 |
| | Permeability coefficient $10^{-10}$ cc(STP) · cm/cm² · s · cmHg | — | 17 | — | — | 0.82 |
| Example 5 | Permeation rate $10^5$ cc/m² · 24 hours · atm | 23.0 | 13.0 | — | — | — |
| | Permeability coefficient $10^{-10}$ cc(STP) · cm/cm² · s · cmHg | 63 | 36 | — | — | — |

TABLE 5

| | Separation factor | | | |
|---|---|---|---|---|
| CO$_2$/O$_2$ | CO$_2$/N$_2$ | O$_2$/N$_2$ | CO$_2$/CH$_4$ | H$_2$/CO$_2$ |
| 3.0 | 9.9 | 3.3 | 20 | 1.8 |

TABLE 6

| | | Hydrogen | Carbon dioxide | Oxygen | Nitrogen | Methane |
|---|---|---|---|---|---|---|
| Example 3 | Before separation | — | 0.1 | 21 | 79 | — |
| | After separation | — | 0.7 | 46.4 | 52.9 | — |
| Example 4 | Before separation | — | 40.1 | — | — | 59.1 |
| | After separation | — | 93.1 | — | — | 6.9 |
| Example 5 | Before separation | 75 | 25 | — | — | — |
| | After separation | 95.8 | 4.2 | — | — | — |

Tables 4 to 6 show that oxygen, carbon dioxide, and hydrogen can also selectively permeate through the semipermeable membrane. Specifically, according to the semipermeable membrane, as shown in Example 3, a gas having a high concentration of oxygen can be obtained from a mixed gas of carbon dioxide, oxygen, and nitrogen. As shown in Example 4, a carbon dioxide gas having a high purity can be obtained from a mixed gas of carbon dioxide and methane. Furthermore, as shown in Example 5, a hydrogen gas having a high purity can be obtained from a mixed gas of hydrogen and carbon dioxide.

REFERENCE SIGNS LIST

1 semipermeable membrane layer
2 supporting body
3 first supporting layer
4 second supporting layer

The invention claimed is:

1. A semipermeable membrane comprising a semipermeable membrane layer containing an amorphous resin as a main component, and a supporting sheet that supports the semipermeable membrane layer,
   wherein the supporting sheet has a porous first supporting layer and a porous second supporting layer laminated on one of surfaces of the first supporting layer,
   the second supporting layer has a smaller mean flow pore diameter than the first supporting layer,
   the second supporting layer is impregnated with the semipermeable membrane layer, and
   the first supporting layer and the second supporting layer each contain a fluororesin as a main component.

2. The semipermeable membrane according to claim 1, wherein a ratio of the mean flow pore diameter of the second supporting layer to the mean flow pore diameter of the first supporting layer is 1/1,000 or more and 1/5 or less.

3. The semipermeable membrane according to claim 1, wherein the mean flow pore diameter of the first supporting layer is 0.05 μm or more and 20 μm or less, and the mean flow pore diameter of the second supporting layer is 0.01 μm or more and 1 μm or less.

4. The semipermeable membrane according to claim 1, wherein the first supporting layer has a bubble point of 10 kPa or more and 350 kPa or less as measured in accordance with ASTM F316-86 using isopropyl alcohol, and the second supporting layer has a bubble point of 500 kPa or more and 3,000 kPa or less as measured in accordance with ASTM F316-86 using isopropyl alcohol.

5. The semipermeable membrane according to claim 1, wherein the first supporting layer has a porosity of 40% or more and 90% or less, and the second supporting layer has a porosity of 30% or more and 80% or less.

6. The semipermeable membrane according to claim 1, wherein the semipermeable membrane layer has an average thickness of 0.2 μm or more and 10 μm or less.

7. The semipermeable membrane according to claim 1, wherein the semipermeable membrane layer is impregnated to an interface between the first supporting layer and the second supporting layer.

8. The semipermeable membrane according to claim 1, wherein the amorphous resin is an amorphous fluororesin.

9. The semipermeable membrane according to claim 1, wherein the first supporting layer comprises an expanded film.

10. A method for producing a semipermeable membrane including a semipermeable membrane layer containing an amorphous resin as a main component, and a supporting sheet that supports the semipermeable membrane layer, the method comprising:
    a laminating step of laminating a porous first supporting layer and a porous second supporting layer to prepare a supporting sheet;
    a dispersion impregnation step of impregnating the supporting sheet with a dispersion of an amorphous resin; and
    a drying step of drying the supporting sheet impregnated with the dispersion,
    wherein the second supporting layer has a smaller mean flow pore diameter than the first supporting layer, and
    the first supporting layer and the second supporting layer each contain a fluororesin as a main component.

* * * * *